Jan. 16, 1923.

W. G. MYLIUS.
MAXIMUM DEMAND METER.
FILED MAY 13, 1918.

1,442,085.

2 SHEETS—SHEET 1.

WITNESSES:
J. P. Wurml
J. H. Procter

INVENTOR
Walter G. Mylius.
BY
Wesley G. Carr
ATTORNEY

Jan. 16, 1923.

W. G. MYLIUS.
MAXIMUM DEMAND METER.
FILED MAY 13, 1918.

1,442,085.

2 SHEETS—SHEET 2.

WITNESSES:

INVENTOR
Walter G. Mylius
BY
ATTORNEY

Patented Jan. 16, 1923.

1,442,085

UNITED STATES PATENT OFFICE.

WALTER G. MYLIUS, OF WILKINSBURG, PENNSYLVANIA, ASSIGNOR TO WESTINGHOUSE ELECTRIC & MANUFACTURING COMPANY, A CORPORATION OF PENNSYLVANIA.

MAXIMUM-DEMAND METER.

Application filed May 13, 1918. Serial No. 234,097.

*To all whom it may concern:*

Be it known that I, WALTER G. MYLIUS, a citizen of the United States, and a resident of Wilkinsburg, in the county of Allegheny and State of Pennsylvania, have invented a new and useful Improvement in Maximum-Demand Meters, of which the following is a specification.

My invention relates to electrical measuring instruments and particularly to maximum-demand meters.

One object of my invention is to provide a meter, of the above-indicated character, that shall be adapted to indicate, at all times, the integrated periodic demand of energy traversing the same.

Another object of my invention is to provide means for successively resetting the indicating device of a maximum-demand meter at rates corresponding to the rate of consumption of energy during predetermined previous periods of time.

A further object of my invention is to provide a meter of the above-indicated character that shall be relatively simple and inexpensive to construct and accurate in its operation.

In practicing my invention, I provide a motor meter for actuating one element of the differential device. A plurality of gear mechanisms are adapted to be actuated by a constant-speed device, such as a clock, and are so periodically set or controlled by the motor meter and so successively connected to the other element of the differential device that a pointer, which is connected to the planetary element of the differential device, is caused to indicate, at all times, the difference between the integrated value of the power traversing the meter and the integrated value of the power that traversed the meter during some previous period of time. If the number of gear devices is relatively large, the resetting of the pointer may be substantially continuous, and thus, the pointer may indicate, at all times, the true periodic demand of energy traversing the meter.

Figure 1:
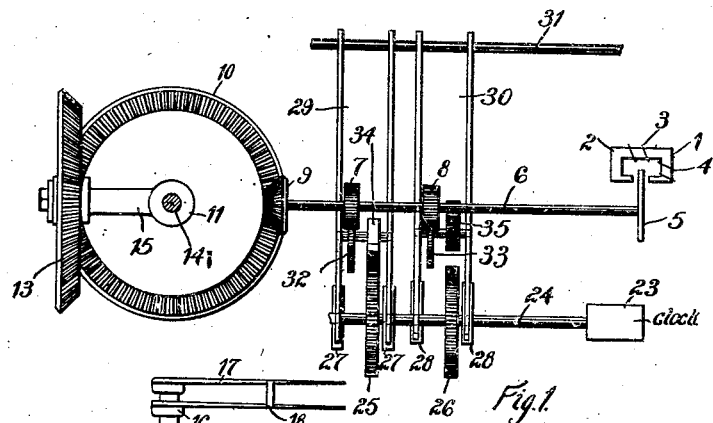
Figure 2:
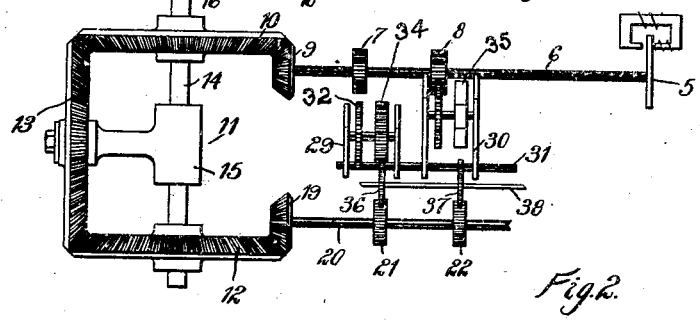
Figure 3:
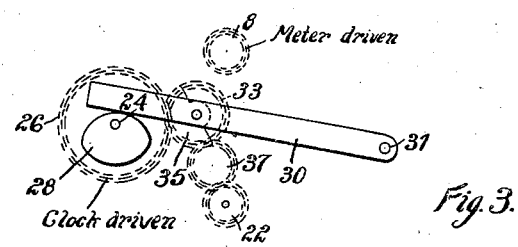
Figure 4:
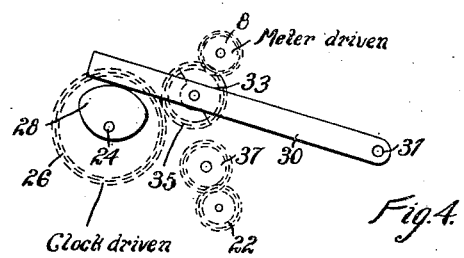
Figure 5:
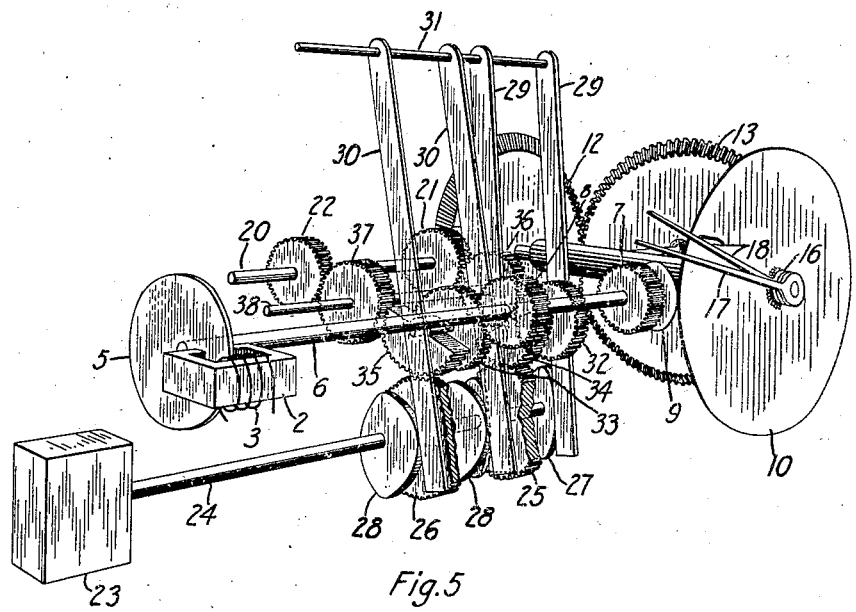

Figure 1 of the accompanying drawings is a diagrammatic top plan view of a measuring instrument embodying my invention; Fig. 2 is a diagrammatic side elevational view of a meter shown in Fig. 1, Figs. 3 and 4 are diagrammatic views illustrating one of the resetting devices of the meter in its two positions of operation, and Fig. 5 is a perspective view of the instrument embodying my invention.

A motor meter 1, comprising a magnetizable core member 2, windings 3 and 4 and an armature 5, is adapted to actuate a shaft 6 upon which are mounted gear wheels 7 and 8 and a bevel pinion 9. The pinion 9 engages the bevel gear wheel 10 of a differential device 11 that comprises a second bevel gear wheel 12 and a third bevel gear wheel 13 which constitutes the planetary member of the device. The gear wheels 10 and 12 are loosely mounted upon a shaft 14 upon which an arm 15 and a pointer 16 are secured. The gear wheel 13 is mounted on the arm 15 and engages the gear wheels 10 and 12. A pointer 17 is loosely mounted on the shaft 14 and is adapted to be engaged by a projection 18 on the pointer 16 for the purpose of actuating the pointer 17 in one direction only. A bevel pinion 19 is operatively connected to the bevel gear wheel 12 and is mounted on a shaft 20 upon which gear wheels 21 and 22 are also mounted.

A constant-speed device 23, such as a clock, is adapted to actuate a shaft 24 upon which are mounted gear wheels 25 and 26 and cam members 27 and 28. Cradle members 29 and 30 are pivotally mounted on the shaft 31 and have mounted thereon gear wheels 32 and 33, respectively, and segmental gear wheels 34 and 35, respectively. The cradle members 29 and 30 are adapted to engage the cam members 27 and 28 which are so positioned that the cradle members 29 and 30 are moved successively to their various positions. That is, the cradle member 29 is in its lowermost position when the cradle member 30 is in its uppermost position. If a plurality of cradle members are used, the cam members should be disposed equi-distant about the shaft 24. The gear wheels 32 and 33 are adapted to engage the gear wheels 7 and 8, respectively. The segmental gear wheel 34 is adapted to engage the gear wheel 25 and the idler gear wheel 36, and, similarly, the segmental gear wheel 35, is adapted to engage the gear wheel 26 and the idler gear wheel 37. The idler gear wheels 36 and 37 are mounted on a shaft 38 and engage the gear wheels 21 and 22, respectively, that are mounted on the shaft 20.

The motor meter 1 so actuates the pointer 16, through the differential device 11, that it moves a distance in a clockwise direction corresponding to the integrated power traversing the meter. Since the shaft 24 is actuated by the constant-speed device 23, the cam member 28 will move the cradle 30 to such position that the gear wheel 33 will engage the gear wheel 8. Thus, the gear wheel 33 and the segmental gear wheel 35, which are mounted on a common shaft, will be turned a distance proportional to the power traversing the meter 1 during a predetermined period of time. After the expiration of that period of time, the cam member 28 will be turned to the position shown in Fig. 3 of the drawings. In this position, the segmental gear wheel 35 will operatively connect the gear wheel 26 to the gear wheel 37, and, since the gear wheel 37 engages the gear wheel 22, the constant-speed device 23 will actuate the gear wheel 12 of the differential device 11 in a counter-clockwise direction through the gear wheel 26, the segmental gear wheel 35, the idler gear wheel 37, the gear wheel 22, the shaft 20 and the pinion 19 an amount proportional to the rate at which power traversed the motor meter 1 during a previous predetermined period of time. That is, the relative position, with respect to the gear wheel 26, to which the segmental gear wheel 35 was turned by the motor meter, determines the length of time that the segmental gear wheel 35 will operatively connect the gear wheels 26 and 37. Thus, the pointer 16 will move in accordance with the difference between the present rate of operation of the motor meter 1 and the rate at which it operated during a previous predetermined interval of time.

The operation of the cradle 29 is similar to that set forth with respect to the cradle 30, with the exception that, when the segmental gear wheel 34 is being positioned through the gear wheel 7 and the gear wheel 32, the segmental gear wheel 35 is in engagement with the gear wheel 37 and, conversely, when the segmental gear wheel 34 is in engagement with the gear wheel 25 and the gear wheel 36, the segmental gear wheel 35 is being set through the gear wheel 8, and gear wheel 33. Thus, since the shaft 20 is, at all times, being actuated through the one or the other of the gear wheels 21 and 22 and, since it is actuated in accordance with the rate of consumption of power during previous predetermined periods of time, the differential device 11 will cause the pointer 16 to indicate, at all times, the periodic demand of energy to be measured, and a pointer 17 will indicate the maximum value of this periodic demand of energy.

My invention is not limited to the particular structure illustrated as it may be variously modified without departing from the spirit and scope of the invention, as set forth in the appended claims.

I claim as my invention:

1. In a measuring instrument, the combination with a motor meter, a constant-speed device and a differential device, of means whereby the motor meter actuates one element of the differential device, and a plurality of means actuated by the constant-speed device and controlled by the motor meter for actuating successively the other element of the differential device.

2. In a measuring instrument, the combination with a motor meter, a constant-speed device and a pointer, of means whereby the motor meter actuates the pointer in one direction, and a plurality of means actuated by the constant-speed device and controlled by the motor meter for successively actuating the pointer in the opposite direction.

3. In a measuring instrument, the combination with a motor meter and a constant-speed device, of means actuated in accordance with the speed of the motor meter, means recurrently actuated by the constant-speed device and recurrently controlled by the motor meter, and means for indicating the differential action of the said two means.

4. In a measuring instrument, the combination with a motor meter and a constant-speed device, of an actuated means operatively connected to the motor meter, a second actuated means, a plurality of means actuated by the constant-speed device and controlled by the motor meter for successively actuating the second actuated means, and means for indicating the differential action of the said two actuated means.

5. The combination with a differential device and a pointer operatively connected thereto, of a motor meter for actuating one member of the differential device, a constant-speed device, and a plurality of means actuated by the constant-speed device for successively actuating the other member of the differential device, said means severally being adapted to move a distance controlled by the rate of speed of the motor meter during previous periods of time.

6. The combination with a differential device and a pointer operatively connected thereto, of a motor meter for actuating one member of the differential device, a constant-speed device, and a plurality of segmental gear wheels adapted to successively connect the constant-speed device to the other member of the differential device for periods of time corresponding to the rate of speed of the motor meter during previous predetermined periods of time.

7. In a measuring instrument, the combination with a motor meter, a constant-speed device, a differential device and a pointer operatively connected to the differential device, of means whereby the motor meter actuates one member of the differential device, a plurality of cam members actuated by the constant-speed device, a plurality of pivotally-mounted members actuated by the cam members, segmental gear wheels mounted on the pivotally-mounted members, and means for successively connecting the segmental gear wheels between the constant-speed device and another member of the differential device, said segmental gear wheels being adapted to be so turned by the motor meter that the time of engagement with the constant-speed device will be proportional to the rate of speed of the motor meter during a predetermined previous period of time.

8. In a measuring instrument, the combination with a motor meter, a constant-speed device, a differential device and a pointer actuated thereby, of means whereby the motor actuates one member of the differential device, and a plurality of means actuated by the constant-speed device and so controlled by the motor meter that the other member of the differential device is actuated at a rate proportional to the rate of advance of the first mentioned differential member over some previous interval of time.

9. In a measuring instrument, the combination with a motor meter, a constant-speed device and a differential device, of means whereby the motor meter actuates one element of the differential device, and means actuated by the constant-speed device and controlled by the motor meter for actuating successively the other element of the differential device an amount proportional to the rate of advance of the first differential element over previous intervals of time.

In testimony whereof, I have hereunto subscribed my name this 30th day of April 1918.

WALTER G. MYLIUS.